United States Patent [19]

Mitsui et al.

[11] Patent Number: 5,534,580
[45] Date of Patent: Jul. 9, 1996

[54] STYRENIC RESIN COMPOSITION AND INJECTION- AND EXTRUSION-MOLDED ARTICLES

[75] Inventors: Shinichi Mitsui; Hayato Kihara; Shuji Yoshimi, all of Ichihara, Japan

[73] Assignee: Sumitomo Chemical Company, Limited, Osaka, Japan

[21] Appl. No.: 334,330

[22] Filed: Nov. 4, 1994

[30] Foreign Application Priority Data

| Nov. 5, 1993 | [JP] | Japan | 5-276995 |
| Dec. 22, 1993 | [JP] | Japan | 5-324537 |
| Apr. 5, 1994 | [JP] | Japan | 6-067110 |

[51] Int. Cl.$^6$ .................................................. C08K 3/32
[52] U.S. Cl. ..................... 524/417; 523/220; 523/221; 524/423; 524/451; 524/493; 524/497; 524/505
[58] Field of Search ........................... 523/220, 221; 524/417, 423, 451, 493, 497, 505

[56] References Cited

U.S. PATENT DOCUMENTS

| 3,873,645 | 3/1975 | Muirhead et al. | 524/505 |
| 3,980,611 | 9/1976 | Anderson et al. | 523/220 |
| 4,073,764 | 2/1978 | Hemmerich et al. | 524/497 |
| 4,304,881 | 12/1981 | Aoki et al. | 524/505 |
| 4,357,170 | 11/1982 | Brand | 524/497 |
| 4,361,675 | 11/1982 | Tan et al. | 524/505 |
| 4,639,394 | 1/1987 | Das et al. | 524/505 |
| 5,322,869 | 6/1994 | Yamasaki et al. | 524/451 |

*Primary Examiner*—Edward J. Cain
*Attorney, Agent, or Firm*—Sughrue, Mion, Zinn, Macpeak & Seas

[57] ABSTRACT

Disclosed are a styrenic resin composition comprising (a) a styrenic resin having a weight average molecular weight of 100,000 to 2,000,000 and (b) a finely divided particulate inorganic or organic substance, the inorganic substance having a refractive index of 1.5–2.0 and an average particle diameter of 0.1–20 μm, and the organic substance having a refractive index of 1.5–2.0 and an average particle diameter of 0.1–20 μm and not having a glass transition temperature in a temperature range of 90° C. or below, said particulate inorganic or organic substance accounting for 0.002 to 1 weight % based on the styrenic resin composition, as well as an injection-molded article prepared by molding the styrenic resin composition, and an extrusion-molded article comprising the styrenic resin composition in an amount of at least 50 weight %.

23 Claims, No Drawings

STYRENIC RESIN COMPOSITION AND INJECTION- AND EXTRUSION-MOLDED ARTICLES

FIELD OF THE INVENTION

This invention relates to a styrenic resin composition and injection- or extrusion-molded articles prepared by molding the styrenic resin composition. More particularly, this invention relates to a styrene-based resin composition capable of providing for high impact resistance without compromise in clarity and flowability, a shaped article produced by injection-molding said composition and having good clarity and high impact resistance, and a shaped article produced by extrusion-molding said composition and featuring satisfactory clarity, high impact strength and high tensile strength with a reduced anisotropy of physical properties.

Because of its high rigidity, good dimensional stability and low cost, styrenic resin is used in a broad range of molding applications. Since this resin as such is poor in impact strength, it is common practice to add an elastomer thereto to thereby provide the so-called rubber-modified styrenic resins for applications where high impact resistance is required. However, this practice has the drawback that incorporation of such elastomer sacrifices the favorable inherent properties, namely high rigidity and clarity, of the base styrenic resin.

In the field of injection moldings of late, there is a demand for molded articles of reduced weight. To be light in weight, molded articles must be thin-walled and, in order to meet this requirement, it is necessary that the molded articles have high impact strength and that the styrene-based resin composition exhibits high flowability during injection molding. Moreover, as far as injection moldings are concerned, the residual strain produced during molding is a factor of consideration. That is to say, it is known that a large residual strain seriously detracts from the impact strength of the molded articles, and therefore it is necessary to minimize the level of the residual strain. It is generally considered that a residual strain is produced in the resin by fluid shearing during injection molding, and for the purpose of reducing the residual strain, it is essential that the resin have high flowability during injection molding.

As an attempt to meet the above requirements, it has been proposed to increase the strength of the molded articles by increasing the molecular weight of the resin. However, this method has the disadvantage that melt flowability of the resin is reduced to cause a short shot during molding operation, and if molding could ever be done, a high fluid shearing develops to thereby increase the residual strain.

As a method for enhancing the flowability of the styrene resin with its high molecular weight being maintained, it has been proposed to add a plasticizer such as mineral oil to the resin. However, this method has the drawback that the plasticizer detracts from the heat resistance and impact strength of the resulting molded articles.

Another method heretofore proposed for maintaining heat resistance and impact strength of the resulting molded articles at a satisfactory level and also for improving flowability of the styrene resin compositions consists in broadening the molecular weight distribution of the resin. Thus, Japanese Examined Patent Publications (Kokoku) Nos. 57-30843 and 62-61231 disclose a technique for providing resin compositions having a broadened molecular weight distribution by blending a polystyrene of high molecular weight with a polystyrene of low molecular weight or by employing a multi-stage polymerization technique. However, these methods have the commercially undesirable drawback that the manufacturing process is complicated to increase the cost of production and, moreover, it is difficult to impart a satisfactory level of impact strength to the molded articles. Japanese Unexamined Patent Publications (Kokai) Nos. 48-45590 and H2-170806 disclose the technique which comprises using a compound having a plurality of vinyl groups in the polymerization stage to broaden the molecular weight distribution of the resin. However, the resin compositions obtained by these methods have the drawback of having poor flowability.

Meanwhile, styrenic resin is commonly molded into film and sheet by extrusion molding. However, the neck-in trouble in extrusion occurs, and the resultant film and sheet have the problem that the strength properties, e.g. tensile strength and flexural strength, in the takeup direction (MD) greatly differs from those in the direction perpendicular thereto (TD), i.e., resulting in a large anisotropy of physical properties. Generally speaking, the TD strength properties are considerably inferior to the MD strength properties with the result that the plane impact strength of the molded article is low.

Incidentally, it is a known practice to increase the impact strength of molded articles by increasing the molecular weight of the polystyrene used. However, this method results in lowered flowability so that the extrusion productivity is sacrificed.

In order to improve the productivity in the extrusion molding, it has been proposed to increase the processing temperature or the takeup speed, but these approaches present the problem that the anisotropy of physical properties is further increased.

SUMMARY OF THE INVENTION

Under the circumstances, an object of this invention is to provide a styrenic resin composition capable of giving molded articles which have high impact strength without compromise in clarity and flowability and which therefore can be thin-walled and light-weight.

Another object of the invention is to provide a molded article which is injection-molded from said resin composition and which has the properties mentioned immediately above.

Another object of the invention is to provide a molded article which is extrusion-molded from said composition and which is satisfactory in clarity and excellent in impact strength and tensile strength characteristics and which has a reduced anisotropy of physical properties.

The inventors of this invention conducted extensive research to overcome the above-mentioned disadvantages of the prior art and have developed this invention.

Thus, the present invention provides, in one aspect, a styrenic resin composition comprising (a) a styrenic resin having a weight average molecular weight of 100,000 to 2,000,000 and (b) a finely divided particulate inorganic substance or a finely divided particulate organic substance, the inorganic substance having a refractive index of 1.5–2.0 and an average particle diameter of 0.1–20 µm, and the organic substance having a refractive index of 1.5–2.0 and an average particle diameter of 0.1–20 µm and not having a glass transition temperature in a temperature range of 90° C. or below, particularly in a temperature range from −130° C. to 90° C., said inorganic or organic substance being present in an amount of 0.002 weight % to 1 weight % based on the styrenic resin composition.

In another aspect, this invention provides a molded article as injection-molded from said styrenic resin composition.

In still another aspect, this invention provides a molded article which is prepared by extrusion molding and which contains at least 50 weight % of said styrenic resin composition.

DETAILED DESCRIPTION OF THE INVENTION

The monomer component(s) that constitute(s) the styrenic resin for use in this invention includes styrene compounds such as styrene, α-substituted alkylstyrenes such as α-methylstyrene, nuclearly alkylated styrenes such p-methylstyrene.

If desired, it is possible to use at least one of such styrene compounds in combination with at least one compound copolymerizable with the styrene compound. Examples of such copolymerizable compound are conjugated dienes such as butadiene, isoprene, etc., vinyl monomers such as acrylonitrile, methacrylonitrile, methacrylic acid and its esters, e.g. methyl methacrylate, maleic anhydride, maleimide, nuclearly substituted maleimides and so on. When such copolymerizable compound is used, it is preferable to use the copolymerizable compound in an amount of about 20 to 30 weight % based on the total amount of the styrene compound and the copolymerizable compound used.

Examples of the styrenic resin for use in this invention are homopolymers of the above styrene compound, and copolymers of about 70–80 weight % of at least one of the styrene compounds and about 20–30 weight % of at least one of the above copolymerizable compounds, and can typically be selected from among polystyrene (PS) and various styrene copolymers or terpolymers, such as styrene-isoprene copolymer, styrene-acrylonitrile copolymer (AS resin), styrene-methyl methacrylate copolymer (MS resin) and so on.

The styrenic resin composition according to this invention contains 0.002–1 weight %, preferably 0.01–0.1 weight %, of a finely divided particulate inorganic or organic substance. Thus, the styrenic resin composition of this invention comprises 99.998–99 weight % of the styrenic resin and 0.002–1 weight % of the finely divided particulate inorganic or organic substance.

The inorganic substance has a refractive index of 1.5–2.0, preferably 1.55–1.65 and an average particle diameter of 0.1–20 μm, preferably not less than 0.1 but less than 5 μm, more preferably 1–4 μm. The organic substance has a refractive index of 1.5–2.0, preferably 1.55–1.65 and an average particle diameter of 0.1–20 μm, preferably not less than 0.1 but less than 5 μm, more preferably 1–4 μm, and free of a fraction having a glass transition temperature of 90° C. or below (i.e., not having a glass transition temperature in a temperature range of 90° C. or below), particularly in a temperature range from −130° C. to 90° C.

As preferred examples of such finely divided particulate substance, there can be mentioned calcium phosphate, barium sulfate, talc, crosslinked polystyrene beads, crosslinked polydivinylbenzene beads, etc., all having a refractive index of 1.5–2.0 and an average particle diameter of 0.1–20 μm.

The inorganic substances are all known and readily available. The organic substances are also known and readily available. Alternatively, the organic substance may be prepared by a conventional method so as to adjust its average particle diameter, refractive index and glass transition temperature to the above-mentioned range. For example, the particle size thereof can be easily adjusted by suitably selecting the polymerization time, stirring speed, type and amount of the crosslinking agent, etc. The refractive index can be easily varied by copolymerizing a base monomer with a suitably selected comonomer which, when homopolymerized, has a different refractive index from the homopolymer of the base monomer.

If the refractive index of the finely divided inorganic or organic particulate substance is excessively outside of the range of 1.5–2.0, the resulting molded article becomes hazy to detract from appearance and clarity. If the average particle diameter of the particulate substance is too large or too small, a sufficient impact strength can hardly be obtained. If the proportion of the particulate substance is excessive, the surface roughness of the molded article tends to be marked to detract from the appearance and clarity of the article.

The refractive index of the particulate substance can be determined by, for example, the following method. Thus, the particulate substance dispersed in a liquid medium having a known refractive index is sandwiched between two pieces of slide glass and observed under a polarization microscope and the refractive index of the specimen is compared with that of the blank medium. Details of the determination method is described in the book entitled "Henko-Kenbikyo-no-Tsukaikata (How to Use A Polarization Microscope)" (authored by Kenya HAMANO, published by Giho-Do).

The average particle diameter of the particulate substance can be measured by, for example, the following method. Thus, the particulate substance is dispersed in a suitable medium, and light is transmitted through the resulting dispersion and the change in the content of the particles is determined. Details of the method is found in the book entitled "Funtai Bussei Zusetsu (the Atlas of Physical Properties of Powders)" edited by The Association of Powder Process Industry And Engineering, Japan, published by Sangyo Gijutsu Center, 1975). The average particle diameter of the particulate substance can also be measured by, for example, the following alternative method. Thus, an ultra-thin slice of the injection-molded product is prepared. Then, a transmission electron microphotograph of the specimen is taken, and the particle diameters are measured on the photograph. The average particle diameter is calculated by means of the following equation:

$$\text{Average particle diameter} = \Sigma n_i D_i^2 / \Sigma n_i D_i$$

where $n_i$ stands for the number of particles with a diameter of $D_i$.

Whether the glass transition temperature of the particles lies within the range not higher than 90° C., particularly within the range from −130° C. to 90° C., can be tested by conducting a differential scanning calorimetry (DSC) in the temperature range of −130° C. to 90° C., using for example Perkin Elmer's DSC 7700. For details of the method, reference can be had to the book entitled "Shin Jikken Kagaku Koza (New Courses in Experimental Chemistry 2 (3. Thermal Analysis)" edited by The chemical Society of Japan, published by Maruzen, 1984, pp. 87–122.

The styrenic resin in the styrenic resin composition of this invention has a weight average molecular weight of 100,000 to 2,000,000 ($1 \times 10^5$–$2 \times 10^6$), preferably 250,000 to 500,000 ($2.5 \times 10^5$–$5 \times 10^5$). If the molecular weight is less than the above range, the impact strength of the resulting injection molded article and extrusion molded article tends to be poor, while an excessively high molecular weight would result in poor flowability.

The weight average molecular weight can be determined by the GPC (Gel Permeation Chromatography) method.

The styrenic resin composition of this invention can be produced by, for example, the following process. Thus, a starting styrene compound or compounds, a particulate substance, and if desired one or more compounds copolymerizable with the styrene compound(s) are homogeneously mixed beforehand, and the resulting system is polymerized, or alternatively the particulate substance is dispersed in the polymerization mixture during or after the polymerization of said styrenic compound or compounds. As a further alternative, the particulate substance is added to a melt of the styrenic resin. The polymerization is conducted in a conventional manner, and the mode of the polymerization may be batchwise suspension polymerization or continuous bulk polymerization. Moreover, either thermal polymerization method or polymerization method using an initiator can be utilized. The polymerization initiator can be suitably selected from a wide range of conventional radical initiators. Examples of such initiators are preferably organic peroxides, such as diisopropyl peroxy dicarbonate, tert-butyl neodecanoate, tert-butyl peroxy pivalate, lauroyl peroxide, benzoyl peroxide, tert-butyl peroxy isopropyl carbonate, tert-butyl peroxybenzoate, dicumyl peroxide, di-tert-butyl peroxide, 1,1'-di-tert-butylperoxy- 3,3,5-trimethylcyclohexane, etc.

To the resulting resin prepared by the polymerization may be added, if desired, various additives such as a lubricant, antistatic agent, antioxidant, heat stabilizer, ultraviolet absorber, pigment, dye and so on. Moreover, within the range not adversely affecting the effects of the invention, plasticizers such as mineral oil can also be added.

The styrenic resin composition of this invention can also be produced by blending the styrenic resin with the particulate substance in the above-mentioned ratio, and melting and kneading the mixture using an extruder.

The injection molding technique for manufacturing the molded article from the styrenic resin composition of this invention is not particularly limited and may be conducted by a conventional manner. An exemplary method comprises injection-molding the composition at a resin temperature of 230° C., an injection speed of 80 cm/sec., an injection pressure of 900 kg/cm$^2$ and a mold temperature of 40° C.

The component other than styrenic resin for use in the extrusion-molded article according to this invention includes styrene-butadiene block copolymer (SBS), among others. When the styrenic resin composition is used in combination with such styrene-butadiene block copolymer for preparing the extrusion-molded article, the styrenic resin composition is used in an amount of at least 50% by weight, preferably about 60 to 99% by weight, more preferably 70 to 95% by weight, based on the weight of the resulting extrusion-molded article. It is preferable that such styrene-butadiene block copolymer has a weight average molecular weight of about 100,000 to about 300,000, and contains about 40 to 90 weight % of styrene unit and about 10 to 60 weight % of butadiene unit.

The technique for manufacturing a molded article by extrusion molding from the styrenic resin composition of this invention is not particularly limited, either. An exemplary process comprises melting the resin composition at a resin temperature of 200° to 280° C. and extruding the melt through a T-die. An alternative process comprises extruding the composition into a sheet and subjecting the sheet to biaxial orientation by the tenter method or the inflation method. In any case, not only the styrenic resin composition of the invention alone but also a homogeneous mixture of said styrenic resin composition and other resin such as the above-mentioned styrene-butadiene block copolymer (SBS) can be used for preparing such extrusion-molded articles.

The injection- or extrusion-molded articles according to this invention can also be manufactured by mixing the styrenic resin with the particulate substance thoroughly, prior to the molding operation and then injection-molding or extruding the resulting composition.

The extrusion-molded article of this invention is suitable for the fabrication of containers by vacuum molding or the like technique and finds application in the packaging field.

The injection-molded article of this invention is excellent in impact strength, and therefore finds use in preparing, for example, various containers or shelves such as compact disk cases, shelves for use in refrigerators, etc.

EXAMPLES

The following examples are intended to describe this invention in further detail. It should be understood that of the evaluations to be described below, the properties already mentioned in the description were determined by the method described hereinbefore and that the following evaluations were made in addition to those mentioned hereinbefore.

(1) Flowability: melt flow rate (MFR)

This parameter was determined in accordance with JIS K7210.

(2) Residual strain (injection-molded articles)

Plates, each measuring 90 mm×150 mm and 2 mm in thickness, were prepared by injection molding at a resin temperature of 230° C. and subjected to retardation measurement in the central part thereof. For the retardation measurement, an Otsuka Denshi model MCPD-1000 multichannel photo detecting system was used. The term "retardation" as used herein means the phase difference between the cross polarized waves after transmission as found when waves are transmitted through the plate. Division of the retardation by the thickness of the test specimen plate gives the index of birefringence. The index of birefringence is related to the principal stress (principal strain) within the plate, and it can be said that the higher the index of birefringence, the greater the residual strain. In this test, the plates used had the same thickness. Therefore, a higher value of retardation corresponds to a higher level of residual strain. The details of the relationship between index of birefringence and residual strain is described, for example, in the monograph "Kodansei Jikkenhou (Photoelasticity Experiments)" (written by Tsuji et al., published by Nikkan Kogyo Shinbun-sha, 1965). For the retardation measurement, the method described in the monograph "Henko-kenbikyo no Tsukaikata (How to Use Polarization Microscopes)" (written by Kenya Hamano, published by Gihodo) was used.

(3) Clarity (total light transmission, haze)

A flat plate measuring 90×150×2 (thickness) mm was prepared by injection-molding at a resin temperature of 230° C., and samples measuring 40×40×2 (thickness) mm were cut out therefrom. Similarly, an extrusion-molded sheet was prepared by extruding a molten styrenic resin composition through a T-die at a temperature of 240° C., and cut into 40×40×0.3 (thickness) mm samples. The clarity of each sample was then measured in accordance with JIS K7105.

(4) Impact strength (falling-ball impact test, for injection-molded articles)

A flat plate measuring 90×150×2 (thickness) mm was prepared by injection-molding at a resin temperature of 230°

C. and cut into a 50×50×2 (thickness) mm sample. Except that the weight of the ball was set at 28.8 g, the directions in JIS K7211 were followed and the 50% failure height was measured. The higher the value, the higher is the impact strength of the shaped article.

(5) Impact strength (cracking energy, for extrusion-molded articles)

The impact strength each of the sheet samples prepared in the examples and comparison examples was measured using the falling weight impact tester manufactured by Toyo Seiki Co., Ltd.

(6) Tensile strength (strength at break, elongation at break; for extrusion-molded articles)

Samples were punched out to No. 1 dumbbell from the sheet prepared in the Examples and Comparison Examples, and the tensile strength each of the samples was measured in the takeup direction (MD) and in the direction perpendicular thereto (TD) in accordance with JIS K7113.

Examples 1–4

To pellets of polystyrene produced by continuous bulk polymerization and having a weight average molecular weight shown in Table 1 below was added 0.1 weight %, based on the total weight of the styrenic resin composition, of a fine powder of tricalcium phosphate having a refractive index of 1.65 and an average particle diameter of 3.9 µm, and the resulting composition was regranulated using a 20 mm diameter extruder at a temperature of 210° C.

Then, using the J150E non-vented injection molding machine manufactured by The Japan Steel Works, Ltd. (JSW), the granules were injection-molded at a resin temperature of 230° C., an injection speed of 80 cm/sec., an injection pressure of 900 kg/cm² and a mold temperature of 40° C. to prepare a flat plate measuring 90×150×2 (thickness) mm. The conditions and results are set forth in Table 1.

Example 5

To pellets of polystyrene produced by continuous bulk polymerization and having a weight average molecular weight of 300,000 was added 0.1 weight %, based on the total weight of the styrenic resin composition, of crosslinked polystyrene beads having a refractive index of 1.59, an average particle diameter of 6.0 µm and a glass transition temperature of 111° C. The resulting composition was regranulated using a 40 mm diameter extruder at 210° C.

Then, using the J150 E non-vented injection molding machine manufactured by The Japan Steel Works, Ltd., the granules were injection-molded at a resin temperature of 230° C., an injection speed of 80 cm/sec., an injection pressure of 900 kg/cm² and a mold temperature of 40° C. to prepare a flat plate measuring 90×150×2 (thickness) mm. The conditions and results are set forth in Table 1.

Example 6

To pellets of polystyrene produced by continuous bulk polymerization and having a weight average molecular weight of 300,000 was added a fine talc powder having a refractive index of 1.55 and an average particle diameter of 2.0 µm in an amount of 0.1 weight % (based on the weight of the styrenic resin composition), and the resulting composition was regranulated with a 40 mm diameter extruder at 210° C.

Then, using the J150E non-vented injection machine manufactured by The Japan Steel Works, Ltd., the granules were injection-molded at a resin temperature of 230° C., an injection speed of 80 cm/sec., an injection pressure of 900 kg/cm² and a mold temperature of 40° C. to provide a flat plate measuring 90×150×2 (thickness) mm. The conditions and results are set forth in Table 1.

Examples 7 and 8

To pellets of polystyrene produced by continuous bulk polymerization and having a weight average molecular weight of 300,000 was added a powder of tricalcium phosphate having a refractive index of 1.65 and an average particle diameter of 3.9 µm in the amounts (based on the weight of the styrenic resin composition) indicated in Table 2.

After thorough mixing, the resulting styrenic resin composition was injection-molded with the J150E non-vented injection molding machine at a resin temperature of 230° C., an injection speed of 80 cm/sec., an injection pressure of 900 kg/cm² and a mold temperature of 40° C. to provide a flat plate measuring 90×150×2 (thickness) mm. The conditions and results are set forth in Table 2.

Example 9

To pellets of polystyrene produced by continuous bulk polymerization and having a weight average molecular weight of 300,000 was added a fine powder of barium sulfate having a refractive index of 1.64 and an average particle diameter of 2.5 µm in the amount (based on the weight of the styrenic resin composition) indicated in Table 2.

After thorough mixing, the resulting styrenic resin composition was injection-molded at a resin temperature of 230° C., an injection speed of 80 cm/sec., an injection pressure of 900 kg/cm² and a mold temperature of 40° C. to provide a flat plate measuring 90× 150×2 (thickness) mm. The conditions and results are set forth in Table 2.

Example 10

To a styrene-methyl methacrylate copolymer having a weight average molecular weight of 258,000 (tradename "Estyrene MS 200", available from Shin Nippon Steel Chemical Co., Ltd.) was added a fine powder of barium sulfate having a refractive index of 1.64 and an average particle diameter of 2.5 µm in the amount (based on the weight of the styrenic resin composition) indicated in Table 2.

After thorough mixing, the resulting styrenic resin composition was injection-molded with the J150E non-vented injection molding machine at a resin temperature of 230° C., an injection speed of 80 cm/sec., an injection pressure of 900 kg/cm² and a mold temperature of 40° C. to provide a flat plate measuring 90×150×2 (thickness) mm. The conditions and results are set forth in Table 2.

Example 11

To pellets of polystyrene produced by continuous bulk polymerization and having a weight average molecular weight of 300,000 was added 0.1 weight %, based on the weight of the styrenic resin composition, of a fine powder of barium sulfate with a refractive index of 1.64 and an average particle diameter of 2.5 µm.

After thorough mixing, the resulting styrenic resin composition was extrusion-molded into a sheet with a thickness of about 0.3 mm by means of the V65-1000 sheet molding machine manufactured by Tanabe Plastics Machinery Co., Ltd. at a resin temperature of 240° C., a screw speed of 30 rpm., a T-die lip clearance of 1.0 mm, a die lip width of 900 mm, a first roll temperature of 90° C., a second roll temperature of 60° C. and a takeup speed of 2.75 m/min. The results are shown in Table 4.

Example 12

In this example, percentages are all based on the weight of the mixture of a polystyrene, a fine powder of barium sulfate and SBS.

To 79.9 weight % pellets of polystyrene produced by continuous bulk polymerization and having a weight average molecular weight of 300,000 was added a block copolymer comprising 77 weight % of styrene and 23 weight % of 1,3-butadiene (SBS) and having a weight average molecular weight of 173,000 in a proportion of 20 % by weight, and the resulting composition was regranulated with a 40 mm diameter extruder at 210° C. To the granules was added 0.1 weight % of a fine powder of barium sulfate with a refractive index of 1.64 and an average particle diameter of 2.5 μm.

After thorough mixing, the resulting composition was extruded into a sheet with a thickness of about 0.3 mm by means of the V65-100 sheet molding machine at a resin temperature of 240° C., a screw speed of 30 rpm, a die lip clearance of 1.0 mm, a die lip width of 900 mm, a first roll temperature of 90° C., a second roll temperature of 60° C. and a takeup speed of 2.75 m/min. The results are shown in Table 4.

Comparison Examples 1–4

The procedures of Examples 1–4 were repeated except that no particulate tricalcium phosphate was used. The conditions and results are shown in Table 2.

Comparison Example 5

To pellets of polystyrene produced by continuous bulk polymerization and having a weight average molecular weight of 300,000 was added 0.001 weight %, based on the weight of the styrenic resin composition, of a fine powder of tricalcium phosphate with a refractive index of 1.65 and an average particle diameter of 3.9 μm, and using a 40 mm diameter extruder, the composition was regranulated at 210° C.

Then, using the J150E non-vented injection molding machine, the granules were injection-molded at a resin temperature of 230° C., an injection speed of 80 cm/sec., an injection pressure of 900 kg/cm$^2$ and a mold temperature of 40° C. to provide a flat plate measuring 90×150×2 (thickness) mm. The conditions and results are set forth in Table 3.

Comparison Example 6

To pellets of polystyrene produced by continuous bulk polymerization and having a weight average molecular weight of 300,000 was added a fine powder of white carbon with a refractive index of 1.45 and an average particle diameter of 5 μm in a proportion of 0.1 weight % (based on the weight of the styrenic resin composition) and the resulting styrenic resin composition was regranulated with a 40 mm diameter extruder at 210° C.

Then, using the J150E non-vented injection machine, the granules were injection-molded at a resin temperature of 230° C., an injection speed of 80 cm/sec., an injection pressure of 900 kg/cm and a mold temperature of 40° C. to provide a flat plate measuring 90×150×2 (thickness) mm. The conditions and results are set forth in Table 3.

Comparison Example 7

To pellets of polystyrene produced by continuous bulk polymerization and having a weight average molecular weight of 300,000 was added 0.1 weight % (based on the weight of the styrenic resin composition) of a fine powder of a crosslinked poly(methyl methacrylate) resin with a refractive index of 1.45 and an average particle diameter of 30 μm and having a glass transition temperature of 143° C., and the resulting styrenic resin composition was regranulated with a 40 mm diameter extruder at 210° C.

Then, using the J150E non-vented injection molding machine manufactured by The Japan Steel Works, Ltd., the resulting composition was injection-molded at a resin temperature of 230° C., an injection speed of 80 cm/sec., an injection pressure of 900 kg/cm and a mold temperature of 40° C. to provide a flat plate measuring 90×150×2 (thickness) mm. The conditions and results are set forth in Table 3.

Comparison Example 8

To pellets of polystyrene produced by continuous bulk polymerization and having a weight average molecular weight of 300,000 was added 0.1 weight % (based on the weight of the styrenic resin composition) of a fine powder of emulsion-polymerized latex rubber with a refractive index of 1.53, an average particle diameter of 0.17 μm and a glass transition temperature of −80° C., and the resulting composition was regranulated with a 40 mm diameter extruder at 210° C.

Then, using the J150E non-vented injection machine manufactured by The Japan Steel Works, Ltd., the granules were injection-molded at a resin temperature of 230° C., an injection speed of 80 cm/sec., an injection pressure of 900 kg/cm$^2$ and a mold temperature of 40° C. to provide a flat plate measuring 90×150×2 (thickness) mm. The conditions and results are set forth in Table 3.

Comparison Example 9

The procedure of Example 10 was repeated except that the fine powder of barium sulfate was not used. The conditions and results are set forth in Table 3.

Comparison Example 10

The procedure of Example 11 was repeated except that the fine powder of barium sulfate was not used. The conditions and results are set forth in Table 4.

Comparison Example 11

The procedure of Example 12 was repeated except that the fine powder of barium sulfate was not used. The conditions and results are set forth in Table 4.

It will be apparent from the results shown in Tables 1–4 that all the examples satisfying the conditions of this invention were very satisfactory in all the evaluation parameters.

On the other hand, the molded articles of Comparison Examples 1–4 and 9–10 not containing a particulate inorganic or organic substance with a refractive index of 1.5–2.0 and an average particle diameter of 0.1–20 μm were poor in impact strength. Moreover, the molded article of Comparison Example 10 showed a large anisotropy of tensile strength.

The molded article of Comparison Example 5 containing the particulate substance in a proportion below the defined range was poor in impact strength.

The molded article of Comparison Example 6 containing particles with a refractive index which is much smaller than that (1.59) of polystyrene was poor in clarity.

The molded article of Comparison Example 7 containing particles having an excessively large average particle diameter and having a refractive index which is much smaller than that (1.59) of polystyrene was poor in impact strength and clarity.

The molded article of Comparison Example 8 containing particles having a glass transition temperatures below 90° C. (i.e., −80° C.) was also poor in impact strength.

Extrusion-molded article of Comparison Example 11 not containing a particulate substance was poor in cracking energy, compared with that achieved by the extrusion-molded article of Example 12 containing a particulate substance.

TABLE 1

|  | Example | | | | | |
|---|---|---|---|---|---|---|
|  | 1 | 2 | 3 | 4 | 5 | 6 |
| Weight average molecular weight, × 10$^4$ | 21 | 30 | 35 | 40 | 30 | 30 |
| Mineral oil, wt. % *1 | 0 | 0 | 4 | 2.3 | 0 | 0 |
| Particulate substance |  |  |  |  |  |  |
| Refractive index | 1.65 | 1.65 | 1.65 | 1.65 | 1.59 | 1.55 |
| Average particle diameter *2, μm | 3.9 | 3.9 | 3.9 | 3.9 | 6.0 | 2.0 |
| Glass transition temperature, °C. | — | — | — | — | 111 | — |
| Proportion, wt. % *3 | 0.1 | 0.1 | 0.1 | 0.1 | 0.1 | 0.1 |
| Evaluation |  |  |  |  |  |  |
| MFR, g/10 min. | 6.8 | 2.4 | 3.0 | 1.5 | 2.4 | 2.4 |
| Residual strain, nm | 1200 | 2700 | 2200 | 3200 | 2700 | 2700 |
| Clarity |  |  |  |  |  |  |
| Total light transmission, % | 89.9 | 90.1 | 90.0 | 90.0 | 90.1 | 89.9 |
| Haze, % | 2.6 | 1.9 | 2.0 | 2.0 | 2.7 | 2.5 |
| Impact strength, cm | 38.0 | 68.0 | 50.2 | 42.5 | 61.6 | 61.7 |

TABLE 2

|  | Example | | | | Comparison Example | | | |
|---|---|---|---|---|---|---|---|---|
|  | 7 | 8 | 9 | 10 | 1 | 2 | 3 | 4 |
| Weight average molecular weight, × 10$^4$ | 30 | 30 | 30 | 25.8 | 21 | 30 | 35 | 40 |
| Mineral oil, wt. % *1 | 0 | 0 | 0 | 0 | 0 | 0 | 4 | 2.3 |
| Particulate substance |  |  |  |  |  |  |  |  |
| Refractive index | 1.65 | 1.65 | 1.64 | 1.64 | — | — | — | — |
| Average particle diameter *2, μm | 3.9 | 3.9 | 2.5 | 2.5 | — | — | — | — |
| Glass transition temperature, °C. | — | — | — | — | — | — | — | — |
| Proportion, wt. % *3 | 0.01 | 0.1 | 0.1 | 0.1 | 0 | 0 | 0 | 0 |
| Evaluation |  |  |  |  |  |  |  |  |
| MFR, g/10 min. | 2.4 | 2.4 | 2.4 | 1.3 | 6.8 | 2.4 | 3.0 | 1.5 |
| Residual strain, nm | 2700 | 2700 | 2700 | 2300 | 1200 | 2700 | 2200 | 3200 |
| Clarity |  |  |  |  |  |  |  |  |
| Total light transmission, % | 90.2 | 90.1 | 90.2 | 90.1 | 90.2 | 90.2 | 90.2 | 90.2 |
| Haze, % | 0.8 | 1.9 | 4.8 | 4.0 | 1.3 | 0.7 | 1.0 | 1.0 |
| Impact strength, cm | 37.0 | 70.4 | 58.8 | 73.4 | 28.0 | 28.5 | 23.9 | 24.0 |

TABLE 3

|  | Comparison Example | | | | |
|---|---|---|---|---|---|
|  | 5 | 6 | 7 | 8 | 9 |
| Weight average molecular weight, 10$^4$ | 30 | 30 | 30 | 30 | 25.8 |
| Mineral oil, wt. % *1 | 0 | 0 | 0 | 0 | 0 |
| Particulate substance |  |  |  |  |  |
| Refractive index | 1.65 | 1.45 | 1.45 | 1.53 | — |
| Average particle diameter *2, μm | 3.9 | 5.0 | 30.0 | 0.17 | — |
| Glass transition temperature, °C. | — | — | 143 | −80 | — |
| Proportion, wt. % *3 | 0.001 | 0.1 | 0.1 | 0.1 | — |
| Evaluation |  |  |  |  |  |
| MFR, g/10 min. | 2.4 | 2.4 | 2.3 | 2.4 | 1.3 |
| Residual strain, nm | 2700 | 2700 | 2800 | 2700 | 2300 |
| Clarity |  |  |  |  |  |
| Total light transmission, % | 90.2 | 91.3 | 90.7 | 89.0 | 90.2 |
| Haze, % | 0.7 | 38.0 | 16.3 | 14.6 | 0.7 |
| Impact strength, cm | 31.1 | 75.0 | 30.7 | 28.3 | 42.1 |

TABLE 4

|  | Example | | Comparison Example | |
|---|---|---|---|---|
|  | 11 | 12 | 10 | 11 |
| Weight average molecular weight, × 10$^4$ | 30 | 30 | 30 | 30 |
| Mineral oil, wt. % *1 | 0 | 0 | 0 | 0 |
| Proportion of SBS rubber, wt. % | 0 | 20 | 0 | 20 |
| Particulate substance |  |  |  |  |
| Refractive index | 1.64 | 1.64 | — | — |
| Average particle diameter *2, μm | 2.5 | 2.5 | — | — |
| Glass transition | — | — | — | — |

TABLE 4-continued

|  | Example | | Comparison Example | |
|---|---|---|---|---|
|  | 11 | 12 | 10 | 11 |
| temperature, °C. |  |  |  |  |
| Proportion, wt. % *3 | 0.1 | 0.1 | 0 | 0 |
| Evaluation |  |  |  |  |
| MFR, g/10 min. | 2.4 | 2.6 | 2.4 | 2.6 |
| Clarity |  |  |  |  |
| Total light trans- | 90.2 | 90.0 | 90.2 | 90.0 |
| mission, % |  |  |  |  |
| Haze, % | 1.1 | 1.8 | 0.4 | 0.8 |
| Impact strength |  |  |  |  |
| Cracking energy, mJ | 17.5 | 34.8 | 3.5 | 26.7 |
| Tensile strength |  |  |  |  |
| at break, kg/cm$^2$ |  |  |  |  |
| MD | 557 | 470 | 547 | 470 |
| TD | 400 | 410 | 275 | 400 |
| Elongation at |  |  |  |  |
| break, * |  |  |  |  |
| MD | 3.6 | 2.1 | 2.8 | 2.1 |
| TD | 2.1 | 1.9 | 1.6 | 1.8 |

*1: The amount of mineral oil is based on the weight of the styrenic resin.
*2: The average particle diameter was measured using the Centrifugal Automatic Particle Analyser CAPA-700 manufactured by Horiba, Ltd. (dispersant: 60-% aqueous solution of glycerin).
*3: The amount of particulate substance is based on the weight of the styrenic resin composition (except for Example 12 and Comparison Example 11).

Thus, this invention provides (a) a styrenic resin composition capable of giving a molded article having high impact resistance without sacrificing the clarity and flowability, (b) a molded article produced by injection-molding said composition and having good clarity and high impact resistance, and (c) a molded article produced by extrusion-molding said composition and featuring satisfactory clarity, high impact strength and high tensile strength with a reduced anisotropy of physical properties.

What is claimed is:

1. A resin composition, comprising:
   (a) a polymer or copolymer of styrene or a styrene-containing compound, said polymer or copolymer having a weight average molecular weight of 100,000 to 2,000,000 and being produced by a thermal polymerization method or a polymerization method using a radical initiator; and
   (b) a finely divided particulate inorganic substance or a finely divided particulate organic substance, the inorganic substance having a refractive index of 1.5–2.0 and an average particle diameter of 0.1–20 μm, and the organic substance having a refractive index of 1.5–2.0, an average particle diameter of 0.1–20 μm and not having a glass transition temperature in a temperature range of 90° C. or below,
   said particulate inorganic or organic substance accounting for 0.002 to 1 weight % based on the resin composition.

2. The resin composition according to claim 1, wherein said particulate substance is calcium phosphate, barium sulfate, talc, crosslinked polystyrene beads or crosslinked polydivinylbenzene beads.

3. A molded article prepared by injection-molding a resin composition, comprising:
   (a) a polymer or copolymer of styrene or a styrene-containing compound, said polymer or copolymer having a weight average molecular weight of 100,000 to 2,000,000 and being produced by a thermal polymerization method or a polymerization method using a radical initiator; and
   (b) a finely divided particulate inorganic substance or a finely divided particulate organic substance, the inorganic substance having a refractive index of 1.5–2.0 and an average particle diameter of 0.1–20 μm, and the organic substance having a refractive index of 1.5–2.0, an average particle diameter of 0.1–20 μm and not having a glass transition temperature in a temperature range of 90° C. or below,
   said particulate inorganic or organic substance accounting for 0.002 to 1 weight % based on the resin composition.

4. An extrusion-molded article, comprising at least 50 weight % of a resin composition, comprising:
   (a) a polymer or copolymer of styrene or a styrene-containing compound, said polymer or copolymer having a weight average molecular weight of 100,000 to 2,000,000 and being produced by a thermal polymerization method or a polymerization method using a radical initiator; and
   (b) a finely divided particulate inorganic substance or a finely divided particulate organic substance, the inorganic substance having a refractive index of 1.5–2.0 and an average particle diameter of 0.1–20 μm, and the organic substance having a refractive index of 1.5–20, an average particle diameter of 0.1–20 μm and not having a glass transition temperature in a temperature range of 90° C. or below,
   said particulate inorganic or organic substance accounting for 0.002 to 1 weight % based on the resin composition.

5. The extrusion-molded article according to claim 4, wherein said resin composition comprises 60 to 90% by weight of said article.

6. The extrusion-molded article according to claim 4 or 5, wherein said particulate substance has an average particle diameter of 0.1 μm to less than 5 μm and is selected from the group consisting of calcium phosphate, barium sulfate, talc, crosslinked polystyrene beads and crosslinked polydivinylbenzene beads.

7. The extrusion-molded article according to claim 4 or 5, wherein said resin composition comprises a styrene-butadiene block copolymer having a molecular weight of 100,000 to 300,000, said styrene-butadiene block copolymer containing 40 to 90 weight % styrene and 10 to 60 weight % butadiene.

8. The resin composition according to claim 1, wherein said styrene or styrene-containing compound is selected from the group consisting of styrene, α-substituted alkylstyrenes and nuclearly alkylated styrenes.

9. The resin composition according to claim 1, wherein said composition comprises a copolymer of styrene or styrene-containing compound with a copolymerizable vinyl monomer.

10. The resin composition according to claim 1, wherein said polymer or copolymer of styrene or a styrene-containing compound is selected from the group consisting of polystyrene, styrene-acrylonitrile copolymer and styrene-methyl methacrylate copolymer.

11. The resin composition according to claim 1, wherein said polymer or copolymer of styrene or a styrene-containing compound has a weight average molecular weight of 250,000 to 500,000.

12. The molded article according to claim 3, wherein said particulate substance is calcium phosphate, barium sulfate, talc, cross-linked polystyrene beads or cross-linked polyvinylbenzene beads.

13. The molded article according to claim 3, wherein said styrene or styrene-containing compound is selected from the group consisting of styrene, α-substituted alkylstyrenes and nuclearly alkylated styrenes.

14. The molded article according to claim 3, wherein said composition comprises a copolymer of styrene or styrene-containing compound with a copolymerizable vinyl monomer.

15. The molded article according to claim 3, wherein said polymer or copolymer of styrene or a styrene-containing compound is selected from the group consisting of polystyrene, styrene-acrylonitrile copolymer and styrene-methyl methacrylate copolymer.

16. The molded article according to claim 3, wherein said polymer or copolymer of styrene or a styrene-containing compound has a weight average molecular weight of 250,000 to 500,000.

17. The extrusion-molded article according to claim 4, wherein said styrene or styrene-containing compound is selected from the group consisting of styrene, α-substituted alkylstyrenes and nuclearly alkylated styrenes.

18. The extrusion-molded article according to claim 4, wherein said composition comprises a copolymer of styrene or styrene-containing compound with a copolymerizable vinyl monomer.

19. The extrusion-molded article according to claim 4, wherein said polymer or copolymer of styrene or a styrene-containing compound is selected from the group consisting of polystyrene, styrene-acrylonitrile copolymer and styrene-methyl methacrylate copolymer.

20. The extrusion-molded article according to claim 4, wherein said polymer or copolymer of styrene or a styrene-containing compound has a weight average molecular weight of 250,000 to 500,000.

21. The resin composition according to claim 1, wherein the inorganic substance and the organic substance each has a refractive index of 1.55 to 1.65 and an average particle diameter of 0.1 to less than 5 μm.

22. The molded article according to claim 3, wherein the inorganic substance and the organic substance each has a refractive index of 1.55 to 1.65 and an average particle diameter of 0.1 to less than 5 μm.

23. The extrusion-molded article according to claim 4, wherein the inorganic substance and the organic substance each has a refractive index of 1.55 to 1.65 and an average particle diameter of 0.1 to less than 5 μm.

* * * * *